(No Model.)

C. W. REEVES.
MUCILAGE BOTTLE.

No. 571,456. Patented Nov. 17, 1896.

WITNESSES:
S. M. Holden
C. Gist

INVENTOR
Clinton W. Reeves.
BY
Edgar Tate & Co
ATTORNEYS.

UNITED STATES PATENT OFFICE.

CLINTON WILLIAM REEVES, OF LOS ANGELES, CALIFORNIA.

MUCILAGE-BOTTLE.

SPECIFICATION forming part of Letters Patent No. 571,456, dated November 17, 1896.

Application filed January 3, 1896. Serial No. 574,233. (No model.)

*To all whom it may concern:*

Be it known that I, CLINTON WILLIAM REEVES, a citizen of the United States, and a resident of Los Angeles, in the county of Los Angeles and State of California, have invented certain new and useful Improvements in Mucilage-Bottles, of which the following is a specification, reference being had to the accompanying drawings, forming a part thereof, in which similar letters of reference indicate corresponding parts.

This invention relates to mucilage-bottles, and the object thereof is to provide an improved bottle or receptacle of this class, with which is connected a removable cap or cover on which is formed a tubular extension through which the handle of a brush is adapted to be passed, a further object being to provide an extensible handle for mucilage-brushes to be used in connection with my improved mucilage bottle or receptacle; and with this and other objects in view the invention consists in the construction, combination, and arrangement of parts hereinafter described and claimed.

The invention is fully disclosed in the following specification, of which the accompanying drawings form a part, in which—

Figure 1:
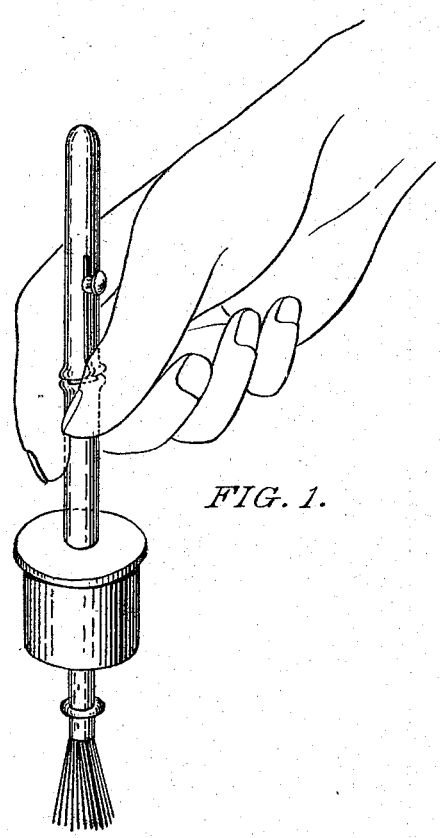
Figure 2:
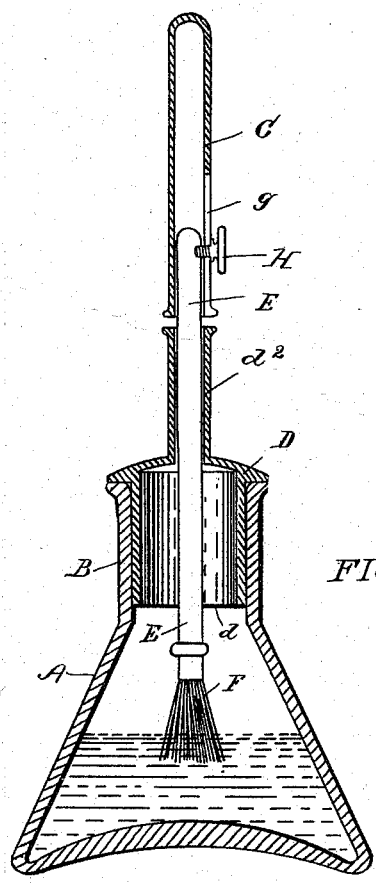

Figure 1 is a perspective view of the removable cap or cover of my improved mucilage bottle or receptacle, showing also the brush connected therewith; and Fig. 2, a central vertical section of my improved mucilage bottle or receptacle, showing also the handle in position and the extensible portion thereof in section.

In the practice of my invention I provide a bottle A, which may be of any desired shape, and on which is formed a neck B. The neck B is provided with a removable cap or cover D, to the lower side of which is secured or on which is formed a tubular extension $d$, which is adapted to fit within the neck B, and on the upper side of which is formed a small tubular extension $d^2$, through which the handle E of the brush F is adapted to be passed.

The handle E of the brush is preferably cylindrical in form, and connected with the upper end thereof is a tubular extension G, the upper end of which is preferably closed and the lower end of which is open and provided with a longitudinal slot $g$, through which passes a set-screw H, which is adapted to operate in connection with the handle E and by means of which the position of the handle within the tubular extension G may be adjusted as desired.

The lower end of the tubular extension G of the handle is adapted to rest upon the tubular extension $d^2$ of the cap or cover D, and by means of the set-screw H and the slot $g$ the position of the handle E may be adjusted so that the brush F may be within the mucilage in the bottle A at all times, and thus prevent the brush from becoming dry and hard.

The cap or cover D may be removed at any time in order to remove dried or caked mucilage therefrom if such operation should become necessary; but it will be understood that in the operation of the device, when it is desired to use the brush, the cap or cover D is removed, together with the brush, as shown in Fig. 1.

The tubular extension $d$ on the lower side of the cap or cover is preferably formed so as to fit loosely or movably within the neck, and the neck and said tubular extension may be of any desired length, and the tubular extension $d^2$ on the upper side of said cap or cover is also preferably formed so as to allow the handle of the brush to pass freely therethrough and at the same time to form a support for the tubular extension G of said handle.

My invention is not limited to the exact form, construction, and arrangement of parts herein described, and I therefore reserve the right to make all such alterations therein and modifications thereof as fairly come within the scope of the invention.

Having fully described my invention, I claim as new and desire to secure by Letters Patent—

1. A mucilage-bottle provided with a neck, a removable cap or cover therefor, provided with a depending tubular extension adapted to fit loosely within said neck and a small tubular extension formed on the upper side thereof, and a brush the handle of which is adapted to pass through said cap and through said extensions, and provided with a tubular adjustable extension, at the upper end thereof, substantially as shown and described.

2. A mucilage-bottle, substantially as herein shown and described, consisting of a receptacle A, the neck of which is provided with a removable cap or cover D, having an annular horizontal flange or rim adapted to rest upon the neck of the bottle, and to the lower side of which is secured a tubular extension $d$ adapted to fit within the neck of the bottle, and on the upper side of which is formed a small tubular extension $d^2$ adapted to receive the handle E of the brush, and to the upper end of which is connected a tubular extension G, the top of which is closed, and which is provided with a longitudinal slot $g$ to receive a set-screw, operating in connection with the handle to afford adjustability for the same, all combined and operating as and for the purpose set forth.

In testimony that I claim the foregoing as my invention I have signed my name, in presence of the subscribing witnesses, this 23d day of December, 1895.

CLINTON WILLIAM REEVES.

Witnesses:
 S. C. MARTIN,
 C. H. MARTIN.